W. C. Peck.
Churn.
N° 69,476.      Patented Oct. 1, 1867.
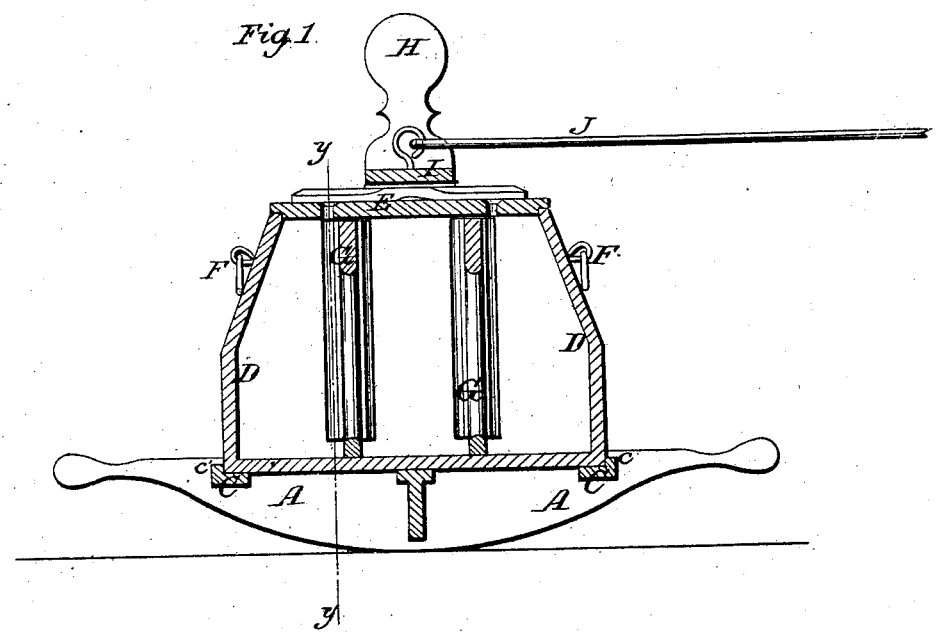
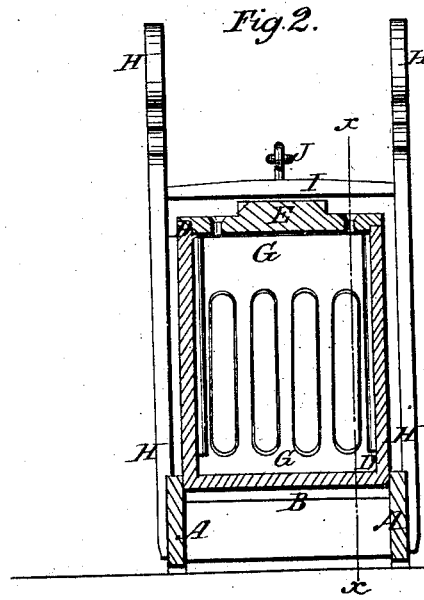
Witnesses
Theo Fusche
Wm Trewin
Inventor.
W. C. Peck.
Per Munn & Co.
Attys.

United States Patent Office.

W. C. PECK, OF WHEELING, WEST VIRGINIA.

Letters Patent No. 69,475, dated October 1, 1867

IMPROVEMENT IN CHURNS.

The Schedule referred to in these Letters Patent and making part of the same.

TO ALL WHOM IT MAY CONCERN:

Be it known that I, W. C. PECK, of Wheeling, in the county of Ohio, and State of West Virginia, have invented a new and improved Churn; and I do hereby declare that the following is a full, clear, and exact description thereof, which will enable others skilled in the art to make and use the same, reference being had to the accompanying drawings, forming part of this specification, in which—

Figure 1 is a vertical longitudinal section of my improved churn, taken through the line $x\,x$, fig. 2.

Figure 2 is a vertical cross-section of the same, taken through the line $y\,y$, fig. 1.

Similar letters of reference indicate like parts.

My invention has for its object to furnish an improved rocking-churn, simple in construction, convenient to be used, and which will do its work quickly and thoroughly; and it consists in the construction and arrangement of the rockers, cream-box, and dashers with each other, as hereinafter more fully described.

A are the rockers, which are connected to each other and held in their proper relative positions by the central cross-bar B and by the end cross-bars C. The cross-bars B and C support the cream-box D, which is kept from slipping out of place by cleats or shoulders $c'$, attached to or formed upon the cross-bars C, as shown in fig. 1. D is the cream-box, which is made in substantially the shape shown in figs. 1 and 2, that is to say, the sides are vertical, and the lower part of the ends is vertical, and the upper parts incline inward. E is the lid or cover, which fits closely upon the top of the churn, and which may have air-holes formed through it, if desired. F are handles, attached to the ends of the cream-box D for convenience in placing it upon and removing it from the rockers. G are two dashers, which are placed vertically in grooves formed in the inner surfaces of the sides of the cream-box, and which are slotted vertically, as shown in figs. 1 and 2, so that as the churn is rocked, the cream, in passing through the slots in the dashers, may be thrown into violent agitation, bringing the butter in a very short time. H are bars or arms, attached to the middle of the outer sides of the rockers A, and which extend up above the top of the churn. The upper parts of the arms H are connected and held in their proper relative positions by the cross-bar I, as shown in the drawings. J is a bar or handle, the end of which is hooked upon or pivoted to the middle part of the cross-bar I, so that the churn may be operated by a person while sitting or standing. If desired, the churn may be operated by the foot placed upon the end of one of the rockers, or by taking hold of the upper end of one of the vertical arms or bars H.

I claim as new, and desire to secure by Letters Patent—

The detachable cream-box D, dashers G, bar B, cross-bar I, and uprights H, all constructed and arranged as herein shown and described.

W. C. PECK.

Witnesses:
A. N. JOHNSTON,
JOHN B. SMITH.